United States Patent Office 2,792,110
Patented May 14, 1957

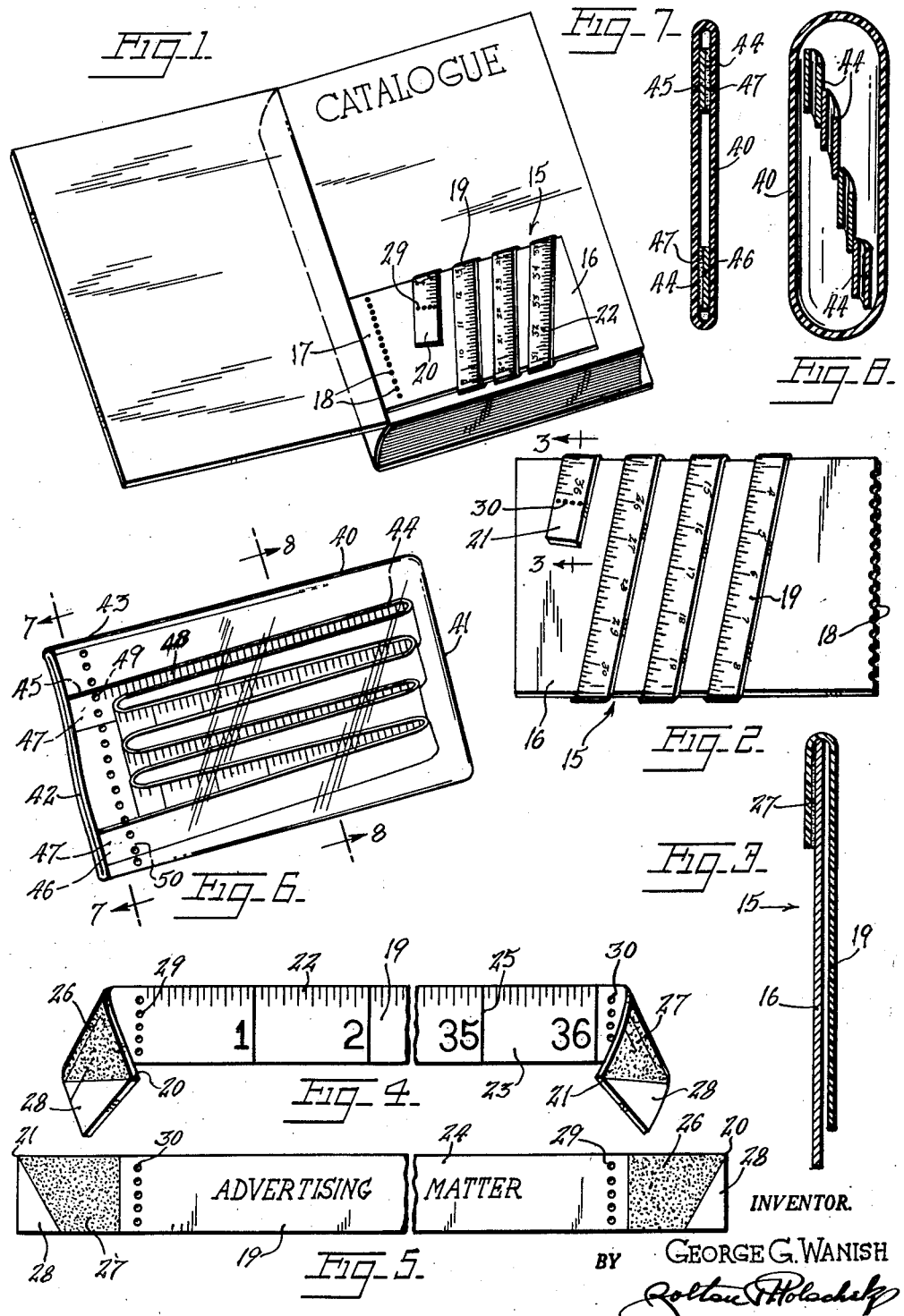

2,792,110

TAPE MEASURE DEVICE FOR CATALOGS AND THE LIKE

George G. Wanish, Cortland, N. Y.

Application August 31, 1955, Serial No. 531,760

2 Claims. (Cl. 206—51)

This invention relates to new and useful improvements in mail order catalog ordering devices.

More particularly, the present invention proposes the construction of an improved tape measure order device which can be enclosed securely in a catalog and which can easily and conveniently be removed from the catalog for measuring waistline, length, height and other dimensions necessary to order garments of the proper size and for measuring lengths and sizes of other articles for ordering by mail.

As a further object, the present invention proposes forming the tape measure ordering device with an order card having a flexible tape measure wound around it with the ends of the tape measure removably secured to the card.

Still further, the present invention proposes constructing the tape measure with two ends having tacky adhesive coated rear faces for attaching either end of the tape removably to an object to be measured.

Another object of the present invention proposes forming the tape with perforated cross portions or tear lines between the tacky adhesive coated end portions of the tape and the calibrated central portion so that the tacky end portions can be conveniently removed when desired.

Still another object of the present invention proposes forming the tacky end portions of the tape with an uncoated corner for removing the tape easily from the order card with the end portions intact when it is not desired to tear the tape from the card along the perforated portions of the tape.

A further object of the invention proposes constructing the tape measure order device with a transparent envelope adapted for enclosure in a catalog with the tape folded and secured in the envelope.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a catalog with an order card and measuring tape constructed and arranged in accordance with the present invention.

Fig. 2 is a rear view of the card shown in Fig. 1 with the tape thereon.

Fig. 3 is an enlarged sectional view taken on line 3—3 of Fig. 2.

Fig. 4 is a front view with parts broken away of the tape shown in Figs. 1, 2 and 3 and with ends of the tape folded forward to show the rear faces thereof.

Fig. 5 is a rear view with parts broken away of the tape shown in Figs. 1 to 4, inclusive.

Fig. 6 is a view similar to Fig. 1 but omitting the catalog and illustrating a modification of the present invention.

Fig. 7 is a sectional view taken on line 7—7 of Fig. 6.

Fig. 8 is a sectional view taken on line 8—8 of Fig. 6.

The tape measure order device in accordance with the first form of the invention illustrated in Figs. 1 to 5, inclusive, is designated generally by the reference numeral 15.

Tape measure order device 15 has an order card 16 adapted to be inserted in a mail order catalog and secured at one end 17 in the usual manner. Order card 16 has a perforated tear line 18 adjacent its secured end 17 for easy removal of the card from the catalog. Preferably the order card 16 is of paper or cardboard having hard surfaces.

Wound around the order card 16 is a measuring tape 19 of flexible material such as paper, fabric or thermoplastic sheet material. Tape 19 has end portions 20 and 21 and a calibrated portion 22 intermediate the end portions. Tape 19 also has a front face 23 and a rear face 24. The calibrations 25 are on the front face 23 and the rear face 24 contains space which may be used for advertising matter.

End portions 20 and 21 have tacky adhesive coatings 26 and 27 on their rear faces. However, each end portion has an uncoated free end corner 28 for raising and lowering the end portion.

Tape 19, in addition, has cross perforated portions or tear lines 29 and 30 between the end portions 20 and 21 and the calibrated portion 22.

To use the tape 19, it may be unwound from the card by raising the tacky adhesive coated end portions 20 and 21 which are adhered to the order card. When this is done, these tacky adhesive coated end portions are available for anchoring either end of the tape for measuring purposes. The tape 19 may also be removed from the card by inserting the fingers under the tape between the tape and the order card and ripping off the tape, the tape being torn along the perforated cross portions or tear lines. One or both tacky end portions may be torn off also after the tape has been removed in the manner first described.

The modification of the invention illustrated in Figs. 6, 7 and 8 is characterized by the provision of a transparent envelope 40 adapted for enclosure in a catalog. The envelope 40 has a closed end 41 and an open end 42 which is secured in closed position in a catalog. Envelope 40 has a perforated portion or tear line 43 adjacent the secured end 42. A tape 44 is folded and disposed inside the envelope 40. Tape 44 has end portions 45 and 46 with tacky adhesive coatings 47 on one side or face and with a calibrated portion 48 between the end portions 45 and 46. In addition, tape 44 has perforated portions or tear lines 49 and 50 adjacent end portions 45 and 46 between the end portions and the calibrated portion 48. The tape 44 is in other respect constructed like tape 19 described above.

Tape 44 has its tacky coated end portions adhered to the inner sides of the envelope 40 and the perforated portions 49 and 50 of tape 44 are aligned with the perforated portion 43 of the envelope 40. In this manner, the tape 44 may easily and conveniently be removed from the envelope with or without the tacky end portions or with either one of them.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A tape measuring for enclosure in a catalog comprising a tape of flexible material having two end portions each with a tacky adhesive coated surface and a calibrated portion intermediate said end portions, said tape having cross perforated portions between said end portions and said calibrated portion, and an order card adapted for enclosure in a catalog, said tape being wound around said card with the tacky adhesive coated end portions adhered to said card.

2. A tape measure for enclosure in a catalog comprising a tape of flexible material having front and rear faces, two end portions on said tape having tacky adhesive coated rear faces, a calibrated portion on the front face of the tape intermediate said end portions, said tape having cross perforated portions between said end portions and said calibrated portion, said end portions each having one uncoated free end corner on the adhesive coated rear face thereof, and an order card adapted for enclosure in a catalog, said tape being wound around said card with the tacky adhesive coated end portions adhered to said card.

References Cited in the file of this patent

UNITED STATES PATENTS

| | | |
|---|---|---|
| 782,092 | Wolff | Feb. 7, 1905 |
| 1,426,569 | Ingram | Aug. 22, 1922 |
| 2,105,881 | Fether | Jan. 18, 1938 |
| 2,185,100 | Berolzheimer | Dec. 26, 1939 |
| 2,602,233 | Irving | July 8, 1952 |
| 2,659,153 | Beeber | Nov. 17, 1953 |